Juan A. Rivera
INVENTOR.

March 11, 1958 J. A. RIVERA 2,826,011
COFFEE WASHER
Filed July 12, 1955 4 Sheets-Sheet 2
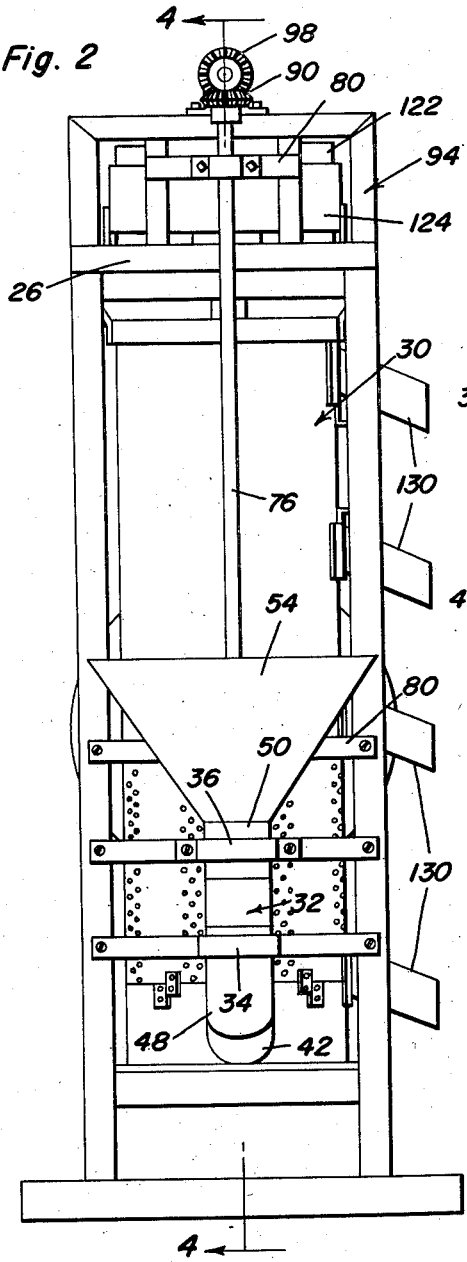
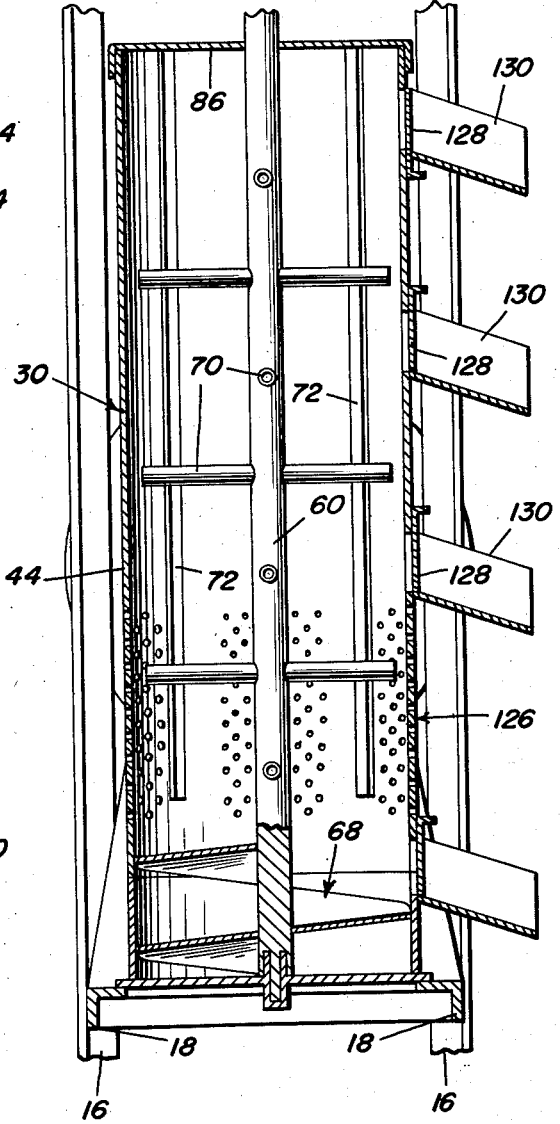
Juan A. Rivera
INVENTOR.

March 11, 1958  J. A. RIVERA  2,826,011
COFFEE WASHER

Filed July 12, 1955  4 Sheets-Sheet 3

Juan A. Rivera
    INVENTOR.

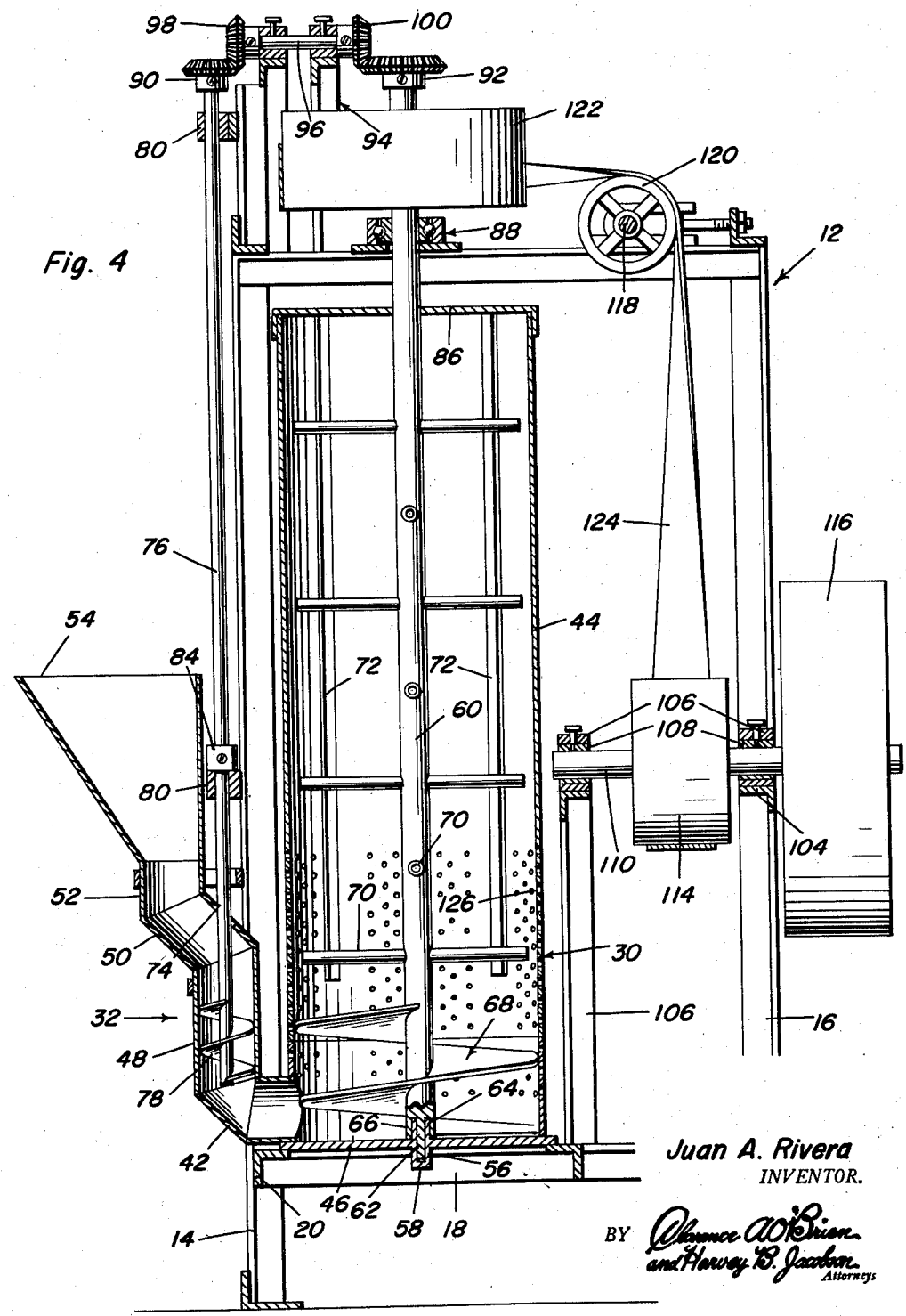

United States Patent Office 2,826,011
Patented Mar. 11, 1958

2,826,011
COFFEE WASHER
Juan A. Rivera, Morovis, Puerto Rico
Application July 12, 1955, Serial No. 521,489
8 Claims. (Cl. 51—163)

The present invention relates to an apparatus for cleaning or washing coffee beans after the husks have been stripped therefrom.

In the coffee industry, after the fruit or coffee beans are picked from their trees, the beans are passed through a husking machine wherein the husks are removed from the coffee seed or grain. After the seeds or grains have had the husks removed therefrom, they are covered with a sticky, mucous-like covering. Heretofore to remove this covering, it has been necessary either to allow the seeds to stand for eight or nine hours and then wash with water and dry, or treat the beans with an appropriate solvent solution to dissolve the mucous-like covering from the grains and then dry the grains.

The primary object of the invention is to provide a machine for cleaning the coffee grains after the husks have been removed therefrom solely by the utilization of the frictional engagement of the beans with one another during the cleaning operation.

A highly important object of the invention, ancillary to the primary object, is in the provision of a machine which utilizes a generally cylindrical upright housing having a cleaning auger adjacent the bottom thereof for moving beans upwardly through the housing as they are fed into the bottom of the housing which cleaning auger acts in conjunction with the feed auger which feeds the beans into the bottom of the housing to be cleaned, to provide utmost physical, frictional contact of the beans with one another during their upward passage through the housing.

A further object of the invention is to provide a series of mixing bars within the housing in vertically spaced relation to one another above the cleaning auger to assist in churning the beans up in the housing as the housing is filled by the constant upward movement of the beans from the cleaning auger.

A further object of the invention, ancillary to the preceding objects, is in the provision of a cleaning housing of the character described wherein openings for releasing cleaned coffee beans from the housing are provided at vertically spaced intervals along the housing whereby the beans need be lifted only so far as is necessary to assure complete cleaning thereof enabling the machine to easily and quickly adjust to the cleaning of varying degrees of the undesirable waste covering on the coffee beans upon husking thereof which may occur through different batches of the beans.

A further object of the invention is to provide a novel feeding arrangement for feeding husked coffee beans into the lower portion of the cylindrical housing wherein the feed auger and the cleaning auger in the housing may be driven from a single source and gearingly connected in a simple manner to one another.

A further object of the invention is to provide a coffee bean cleaning machine which may be utilized in either batch or continuous cleaning operation wherein the housing is provided with a plurality of openings therein for release of the undesirable coating substance of the beans as this coating substance is rubbed off the beans by their continual frictional contact with one another during the passage upward through the housing, the housing being further equipped with longitudinal ribs along the inner surface thereof for further increasing the mixing action of the beans as they are moved upwardly through the housing to assure cleaning thereof.

A final object of the invention to be mentioned specifically is the provision of a simple, durable, inexpensive, economically sound coffee bean cleaning machine which cleans husked coffee beans in a single operation without necessitating any delay in processing of the beans after husking or any chemical treatment of the beans.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a front elevational view of the coffee bean cleaning machine;

Figure 4 is a side elevational view of the cleaning machine in cross section taken substantially along the plane of section line 4—4 of Figure 2;

Figure 5 is a front view of the housing constituting the heart of the machine in cross-section taken substantially along the plane of section line 5—5 of Figure 1.

Figure 1:
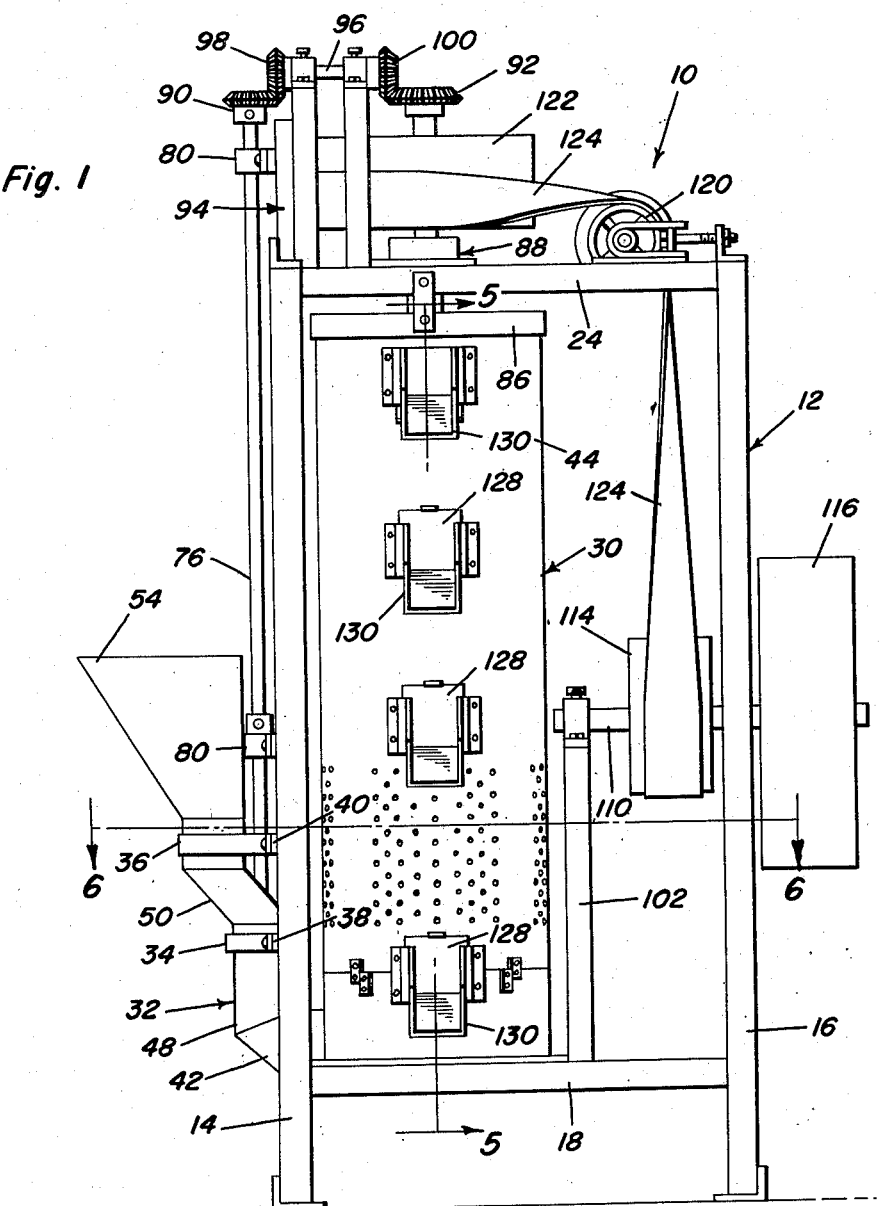
Figure 1 is a side elevational view of a coffee bean cleaning machine embodying the principles of the present invention.
Figure 3:
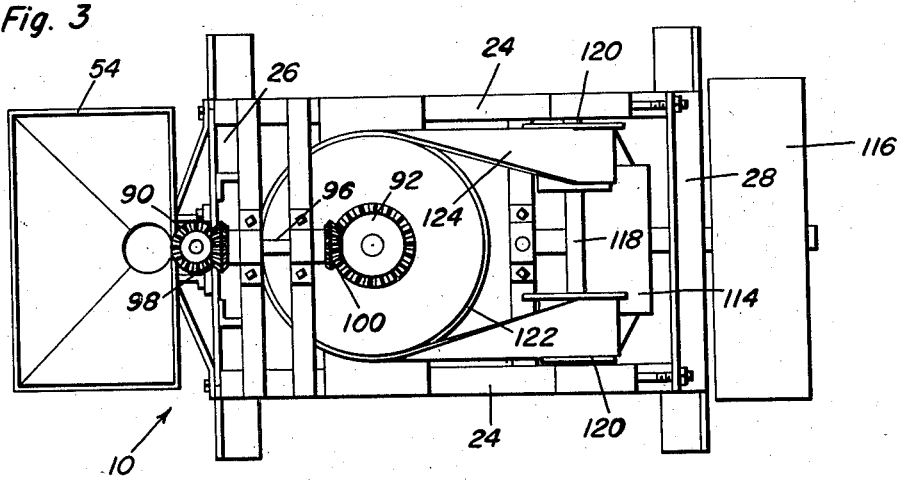
Figure 3 is a top view of the cleaning machine.
Figure 6:
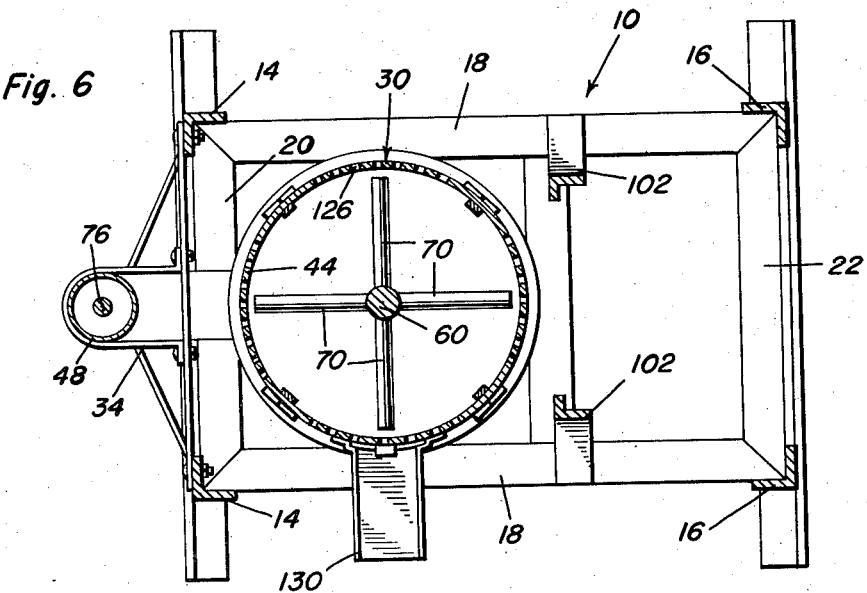
Figure 6 is a transverse cross sectional view through the machine taken substantially on the plane of section line 6—6 of Figure 1.

Referring now to the accompanying drawings in detail, the coffee bean washing or cleaning machine constituting the present invention is designated in its entirety by the numeral 10.

The machine 10 comprises a supporting frame 12 of any suitable configuration and which, in the preferred embodiment shown, comprises a rectangular, open-work frame having front and rear corner posts 14 and 16 connected to one another adjacent their lower ends by lower side and cross rails 18 and front and rear end rails 20 and 22 respectively. At the upper ends, the posts are connected to one another by upper or top side rails 24 and front and rear top end rails 26 and 28, respectively.

Carried within the framework 12 described is a vertically disposed cylindrical housing or tank 30 within which the coffee beans are cleaned. To admit the beans to the housing 30, a feed conduit 32 is attached by suitable brackets 34 and 36 to the front corner legs 14 through the medium of connecting straps 38 and 40, respectively. This feed conduit 32 consists of a horizontally disposed lower section 42 which opens into the side wall 44 of the housing 30 onto the floor or bottom 46 of this housing. The intermediate portion of the feed conduit 32 is vertically disposed and is designated by the numeral 48 whereas a connecting elbow 50 attaches the upper section 52 of the conduit to the remaining portions of the conduit in laterally offset relation thereto and the feed hopper or funnel 54 opens into the laterally offset section 52 of the coffee bean feed conduit 32.

Centrally thereof, the bottom wall 46 of the housing 30 has formed an upwardly opening tubular boss 56 which has a closed bottom 58 disposed below the level of the bottom 46 and an open top disposed above the level of the bottom 46. A vertically extending, axial shaft 60 has a reduced lower end portion 62 rotatably journalled in the hollow boss 56, this reduced lower end portion being sealed against the ingress of foreign matter thereinto by virtue of an annular undercut recess 64 in the major portion of the shaft 60 which forms a sleeve 66 surrounding a portion of the boss 56 extending above the level of the floor 46 of the housing 30.

Carried by the lower end portion of the rotatable shaft 60 is a helical feed auger 68 which has the lower end thereof in engagement with the bottom 46 of the housing 30 and has the upper end thereof terminating a short distance above the bottom 46 of the housing 30. Vertically spaced along the portion of the shaft 60 above the helical cleaning auger 68 are a plurality of mixing bars 70 which extend radially from the shaft at right angles to one another in vertically spaced relation along the shaft. The housing itself, on the inner surface of the side wall 44 thereof carries circumferentially spaced, longitudinally extending ribs 72.

Noting the feed conduit 32, it will be seen that the connecting elbow 50 is provided with an opening 74 therein through which extends the lower end portion of the vertically extending shaft 76. This lower end portion of the vertically extending shaft 76 has carried thereby helical feed augers 78. Suitable brackets 80 carried by the supporting frame 12 journal the feed shaft 76 therethrough and stop collar 84 engages the lowermost journal bracket 80 to prevent axial movement of the feed shaft 76.

The upper end portion of the cleaning auger shaft 60 extends upwardly through the top 86 and is rotatably journalled and axially fixed on the framework 12 by virtue of the bearing mounting 88 carried on top of the framework 12.

The upper ends of the shafts 60 and 76 terminate on approximately the same plane with one another and each is provided with a suitable bevel gear, the bevel gear of the feed shaft being designated by the numeral 90 and that of the cleaning auger shaft 60 being designated by the numeral 92. A super-structure 94 carried on top of the framework 12 rotatably journals a horizontally disposed shaft 96 thereon to the ends of which are attached bevel gears 98 and 100 which are respectively in engagement with the bevel gears 90 and 92. With the arrangement it is obvious that when the cleaning auger shaft 60 is turned in one direction the feed auger shaft 76 will be turned in the opposite direction.

To drive the shafts 60 and 76, a pair of laterally spaced upwardly converging standards 102 are disposed rearwardly of the housing 30 and forwardly of the rear corner legs, being mounted on the lower side rail sections of the frame 12 and carrying journal bearing 106 at the converging upper ends thereof which rotatably journals therein through the mediums of bushing 108 one end portion of a horizontally disposed driveshaft 110, transverse brace 104 extending between rear corner legs 16 carries a second journal bearing 106 and bushing 108, shaft 110 carries a driving wheel 114 between the journal bearings and an operating wheel 116 on the portion of the shaft extending beyond the journal bearings for connection to a suitable motor or the like.

Carried by the top of the framework 12 and extending between the top side rails 24 is a shaft 118 which carries adjacent each end thereof a belt guiding sheaves 120. A belt driven wheel 122 is fixedly carried by the projecting upper end portion of the cleaning auger shaft 60. A belt 124 is entrained over the driving wheel 114 and is twisted at right angles to itself with both runs thereof being guided over the sheaves 120 and thence entrained around the driven wheel 122. Thus, upon rotation of the driveshaft 110, the cleaning auger shaft 60 is rotated and consequently the feed auger shaft 76 is rotated.

The operation of the device is very simple, after the coffee beans to be cleaned have been husked, they are poured through the hopper 54 into the feed conduit 32. They are moved downwardly through the feed conduit 32 by virtue of the rotation of the feed auger 78 in response to rotation of the feed auger shaft 76. Of course during this time, the beans are initially brought into frictional engagement and continuing frictional contact with one another by virtue of the action of the feed auger forcing the beans first downwardly and then horizontally into the bottom of the cleaning housing 30. In the cleaning housing 30, the beans are picked up, mixed and slowly moved upwardly by virtue of the rotation of the helical cleaning auger 68.

Immediately above the cleaning auger and adjacent the cleaning auger the housing 30 is provided in the side wall 44 thereof with a plurality of perforations 126 to allow the passage of the waste cleaned from the beans to the exterior of the housing.

As the beans are moved up by the auger, the mixing bars 70 enhance the frictional engagement of the beans with one another whereas the upward flow turbulence is maintained by virtue of the beans further engagement with the longitudinal bars 72 on the inner surface of the side wall 44 of the housing. This slow mass movement of the beans accompanied by the very fast homogeneous and relatively turbulent frictional rubbing of the beans against one another quickly cleans the beans of the undesirable mucous-like layer thereon.

Inasmuch as the adherence of this layer will obviously vary with the length of the time the beans have been husked or the condition of the bean when husked or numerous other factors, the housing 30 is provided with a plurality of outlet gates 128, these gates 128 being disposed at vertically spaced points along the side wall 44 of the housing 30. Chutes 130 lead from the gates 128 to discharge the cleaned, white coffee beans from the machine.

The construction and the operation of the device as will be noted are relatively simple and consequently easy to maintain and inexpensive to produce. Further, the machine will operate to clean coffee beans without the necessity for any lay-over of the beans in drying time from the time they leave the coffee bean husker or without the necessity for a chemical treatment of the beans.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for cleaning coffee beans after the husks have been removed therefrom by frictional contact of the beans with one another comprising an upright, generally cylindrical housing, a rotatable shaft extending axially through said housing, a vertical feed lifting helical cleaning auger on said shaft for lifting coffee beans upwardly through said housing, and cleaning the beans in response to rotation of said shaft, and a coffee bean feed conduit opening into said housing adjacent the bottom thereof, a feed auger in said feed conduit for feeding coffee beans to said housing, said housing having apertures in the side wall thereof for the drainage of waste therefrom during the cleaning of the beans.

2. An apparatus for cleaning coffee beans after the husks have been removed therefrom by frictional contact of the beans with one another comprising an upright, generally cylindrical housing, a rotatable shaft extending axially through said housing, a vertical feed lifting helical cleaning auger on said shaft for lifting coffee beans upwardly through said housing, and cleaning the beans in response to rotation of said shaft, and a coffee bean feed conduit opening into said housing adjacent the bottom thereof, a feed auger in said feed conduit for feeding coffee beans to said housing, said housing having apertures in the side wall thereof for the drainage of waste therefrom during the cleaning of the beans, said cleaning auger being disposed in the lower portion of said housing, transversely extending bars carried by said shaft above said cleaning auger for mixing the beans moved upwardly in the housing by said cleaning auger.

3. An apparatus for cleaning coffee beans after the husks have been removed therefrom by frictional contact of the beans with one another comprising an upright, generally cylindrical housing, a rotatable shaft extending axially through said housing, a vertical feed lifting helical cleaning auger on said shaft for lifting coffee beans upwardly through said housing, and cleaning the beans in response to rotation of said shaft, and a coffee bean feed conduit opening into said housing adjacent the bottom thereof, a feed auger in said feed conduit for feeding coffee beans to said housing, said housing having apertures in the side wall thereof for the drainage of waste therefrom during the cleaning of the beans, said cleaning auger being disposed in the lower portion of said housing, transversely extending bars carried by said shaft above said cleaning auger for mixing the beans moved upwardly in the housing by said cleaning auger, longitudinally extending ribs carried by said housing on the inner side wall surface thereof to add to the turbulence of the beans during upward movement thereof through the housing while providing maximum frictional engagement of the beans with one another.

4. An apparatus for cleaning coffee beans after the husks have been removed therefrom by frictional contact of the beans with one another comprising an upright, generally cylindrical housing, a rotatable shaft extending axially through said housing, a vertical feed lifting helical cleaning auger on said shaft for lifting coffee beans upwardly through said housing, and cleaning the beans in response to rotation of said shaft, and a coffee bean feed conduit opening into said housing adjacent the bottom thereof, a feed auger in said feed conduit for feeding coffee beans to said housing, said feed conduit having a horizontal section opening into said housing, and a generally vertical section opening into said horizontal section, said feed auger being disposed in said vertical section and having a drive shaft extending upwardly therefrom, means for driving said feed and cleaning auger shafts in opposite directions.

5. The combination of claim 4, said cleaning auger shaft extending upwardly through the top of said housing, gear means interconnecting said shafts for opposite rotation relative to one another.

6. The combination of claim 5, said driving means comprising a drive shaft having a driving wheel thereon, a driven wheel on said cleaning auger shaft, and an endless belt entrained over said wheels.

7. An apparatus for cleaning coffee beans after the husks have been removed therefrom by frictional contact of the beans with one another comprising an upright, generally cylindrical housing, a rotatable shaft extending axially through said housing, a vertical feed lifting helical cleaning auger on said shaft for lifting coffee beans upwardly through said housing, and cleaning the beans in response to rotation of said shaft, said housing having a plurality of vertically spaced gates therein for releasing coffee beans therefrom at different levels.

8. The combination of claim 7 wherein said housing has a portion of the side wall thereof perforated for the release of waste material cleaned from the beans from the housing.

References Cited in the file of this patent
UNITED STATES PATENTS

| | | |
|---|---|---|
| 84,901 | Pease | Dec. 15, 1868 |
| 176,142 | Little | Apr. 18, 1876 |
| 490,611 | Miller | Jan. 24, 1893 |
| 2,113,914 | Day | Apr. 12, 1938 |
| 2,146,776 | Strominger | Feb. 14, 1939 |